US012803074B2

(12) United States Patent
Yoon

(10) Patent No.: US 12,803,074 B2
(45) Date of Patent: Nov. 17, 2026

(54) BATTERY PACK AND DEVICE INCLUDING THE SAME

(71) Applicant: LG ENERGY SOLUTION, LTD., Seoul (KR)

(72) Inventor: Doohan Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 886 days.

(21) Appl. No.: 18/025,383

(22) PCT Filed: Apr. 20, 2022

(86) PCT No.: PCT/KR2022/005652
§ 371 (c)(1),
(2) Date: Mar. 8, 2023

(87) PCT Pub. No.: WO2022/231202
PCT Pub. Date: Nov. 3, 2022

(65) Prior Publication Data

US 2024/0014460 A1 Jan. 11, 2024

(30) Foreign Application Priority Data

Apr. 27, 2021 (KR) ........................ 10-2021-0054358
Apr. 18, 2022 (KR) ........................ 10-2022-0047510

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/6551* (2015.04);
(Continued)

(58) Field of Classification Search
CPC ............. H01M 10/653; H01M 10/613; H01M 10/6551; H01M 50/211; H01M 50/262;
(Continued)

(56) References Cited

U.S. PATENT DOCUMENTS 10,347,874 B2 * 7/2019 Yamamoto .......... H01M 50/598
2012/0021260 A1 * 1/2012 Yasui .................. H01M 10/615
429/71
(Continued)

FOREIGN PATENT DOCUMENTS

CN 102064291 A 5/2011
CN 203481341 U * 3/2014 ............. Y02E 60/10
(Continued)

OTHER PUBLICATIONS

Partial Supplementary European Search Report for European Application No. 22796035.8, dated Nov. 20, 2024.
(Continued)

*Primary Examiner* — Kaity V Chandler
(74) *Attorney, Agent, or Firm* — Birch, Stewart, Kolasch & Birch, LLP

(57) ABSTRACT

A battery pack includes a plurality of battery modules; and a pack case for housing the plurality of battery modules, wherein the pack case includes an upper case. The battery pack further includes a heat radiating member formed so as to make contact with the upper case.

11 Claims, 8 Drawing Sheets

(51) Int. Cl.

| | |
|---|---|
| ***H01M 10/6551*** | (2014.01) |
| ***H01M 50/211*** | (2021.01) |
| ***H01M 50/262*** | (2021.01) |
| ***H01M 50/271*** | (2021.01) |

(52) U.S. Cl.

CPC ....... *H01M 50/211* (2021.01); *H01M 50/262* (2021.01); *H01M 50/271* (2021.01)

(58) Field of Classification Search

CPC ........... H01M 50/271; H01M 10/6554; H01M 10/658; H01M 50/209; H01M 10/625; H01M 10/647; Y02E 60/10

See application file for complete search history.

(56) References Cited

U.S. PATENT DOCUMENTS

| | | | | |
|---|---|---|---|---|
| 2012/0231316 | A1 | 9/2012 | Sohn | |
| 2015/0249238 | A1 | 9/2015 | Andre et al. | |
| 2018/0191041 | A1 | 7/2018 | Jeon et al. | |
| 2019/0181405 | A1 | 6/2019 | Kim et al. | |
| 2019/0288355 | A1 | 9/2019 | An et al. | |
| 2020/0058912 | A1* | 2/2020 | Kuramitsu | .......... H01M 50/209 |
| 2021/0351468 | A1 | 11/2021 | Hur et al. | |
| 2022/0131229 | A1 | 4/2022 | Chi et al. | |
| 2022/0320628 | A1 | 10/2022 | Shin et al. | |
| 2022/0367938 | A1 | 11/2022 | Ando et al. | |
| 2023/0082249 | A1* | 3/2023 | Goldman | ............ H01M 10/667 429/62 |

FOREIGN PATENT DOCUMENTS

| | | | | | |
|---|---|---|---|---|---|
| CN | 104916878 | B | * | 6/2019 | .......... H01M 10/613 |
| CN | 209401694 | U | * | 9/2019 | ............ Y02E 60/10 |
| CN | 111082187 | A | | 4/2020 | |
| CN | 111095596 | A | * | 5/2020 | .......... H01M 10/625 |
| CN | 211719740 | U | | 10/2020 | |
| CN | 109524593 | B | * | 7/2021 | ........ H01M 10/6568 |
| CN | 113889687 | A | * | 1/2022 | ........ H01M 10/6561 |
| DE | 10 2013 021 531 | A1 | | 6/2015 | |
| DE | 10 2019 212 164 | A1 | | 2/2021 | |
| EP | 3 113 278 | A1 | | 1/2017 | |
| JP | 2012204129 | A | * | 10/2012 | ............ Y02E 60/10 |
| JP | 2013-229266 | A | | 11/2013 | |
| JP | 2014-091463 | A | | 5/2014 | |
| JP | 5754497 | B2 | | 7/2015 | |
| JP | 2017-168193 | A | | 9/2017 | |
| JP | 2018-014251 | A | | 1/2018 | |
| JP | 2021-64510 | A | | 4/2021 | |
| KR | 10-2012-0102344 | A | | 9/2012 | |
| KR | 10-2016-0149576 | A | | 12/2016 | |
| KR | 10-2017-0019041 | A | | 2/2017 | |
| KR | 10-2018-0029602 | A | | 3/2018 | |
| KR | 10-2018-0038310 | A | | 4/2018 | |
| KR | 10-2018-0080614 | A | | 7/2018 | |
| KR | 10-2019-0069873 | A | | 6/2019 | |
| KR | 10-1986235 | B1 | | 6/2019 | |
| KR | 10-2020-0113849 | A | | 10/2020 | |
| KR | 10-2021-0000260 | A | | 1/2021 | |
| WO | WO-2013092543 | A1 | * | 6/2013 | .......... H01M 10/625 |
| WO | WO 2018/194296 | A1 | | 10/2018 | |
| WO | WO 2021/060735 | A1 | | 4/2021 | |
| WO | WO-2022055088 | A1 | * | 3/2022 | .......... H01M 10/653 |
| WO | WO-2022055130 | A1 | * | 3/2022 | .......... H01M 10/647 |

OTHER PUBLICATIONS

Extended European Search Report for European Application No. 22796035.8, dated Feb. 17, 2025.

International Search Report, issued in PCT/KR2022/005652, dated Aug. 2, 2022.

* cited by examiner

【FIG. 1】
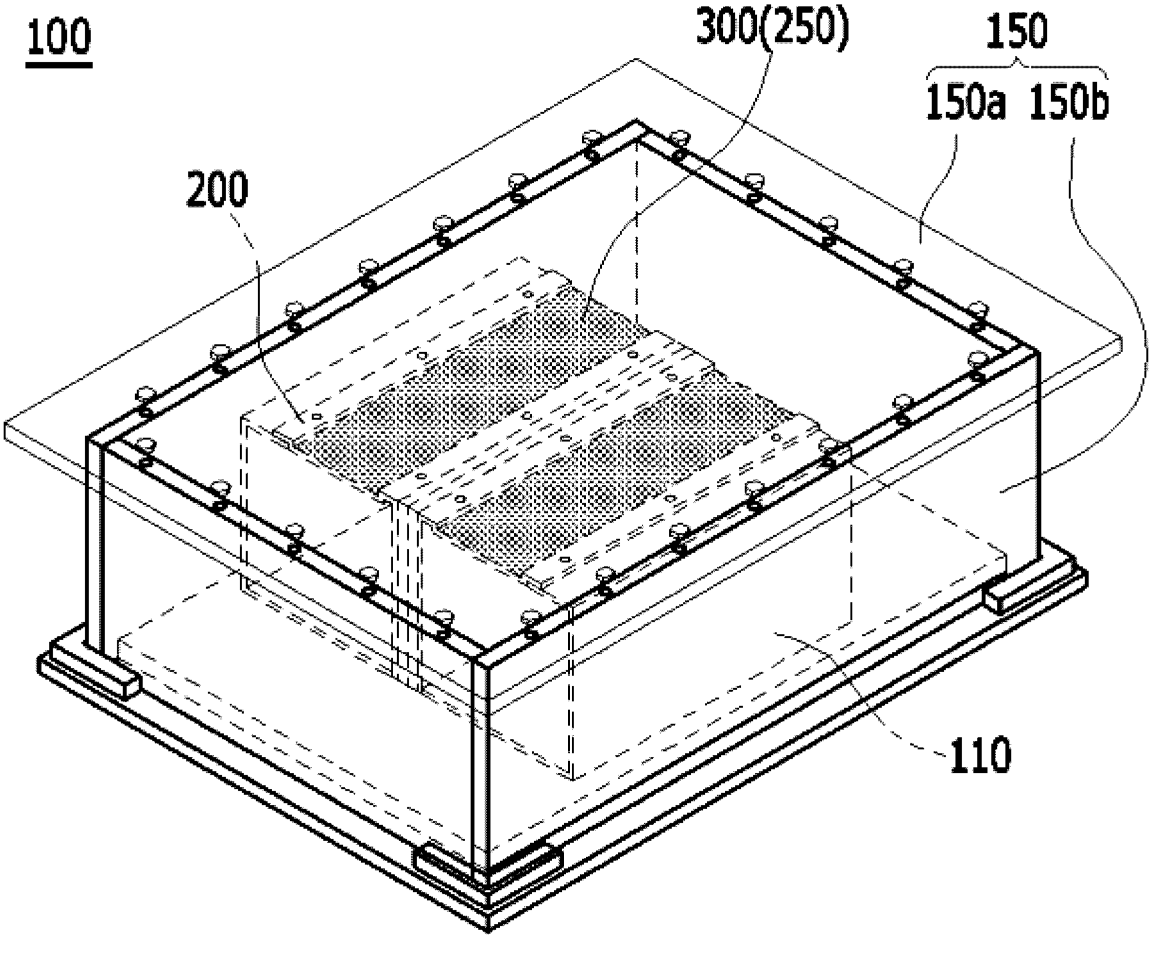

【FIG. 2】
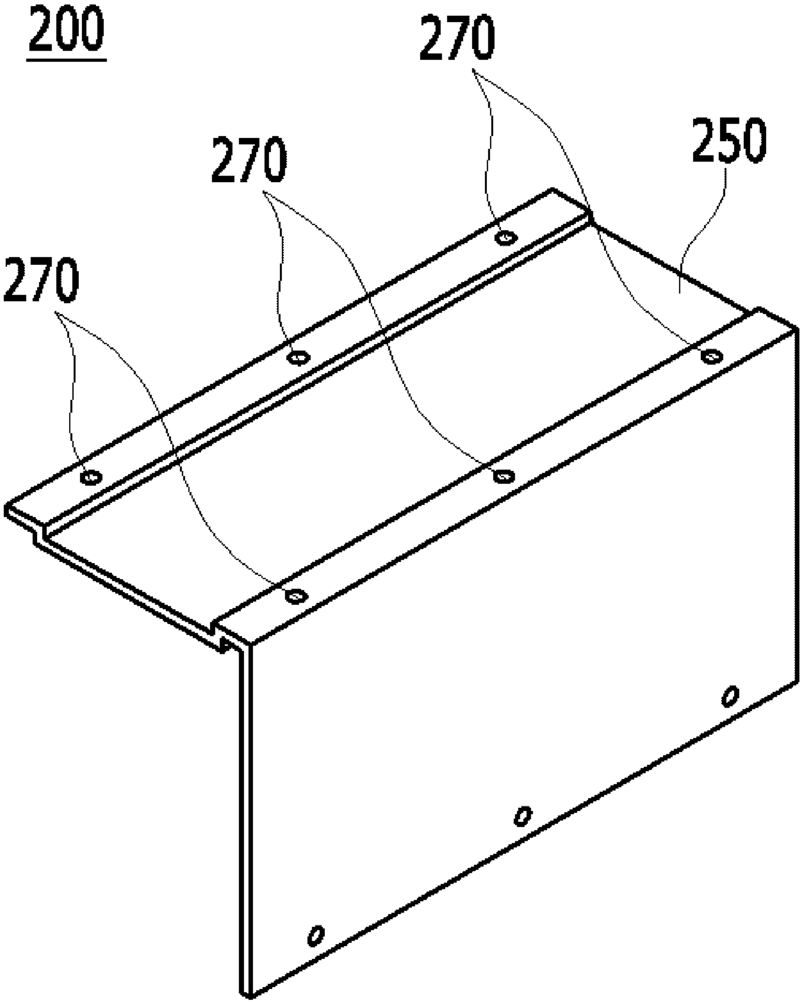

【FIG. 3】
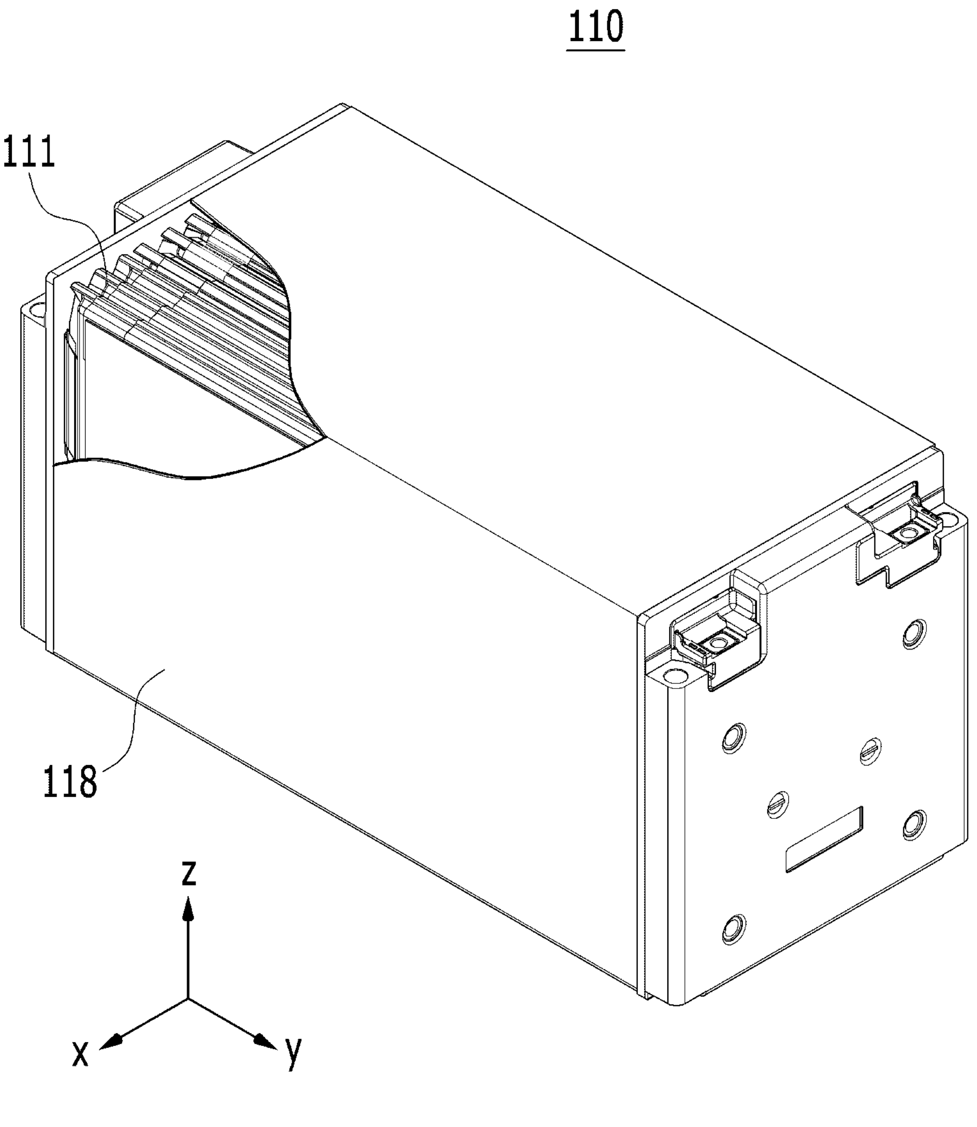

【FIG. 4】
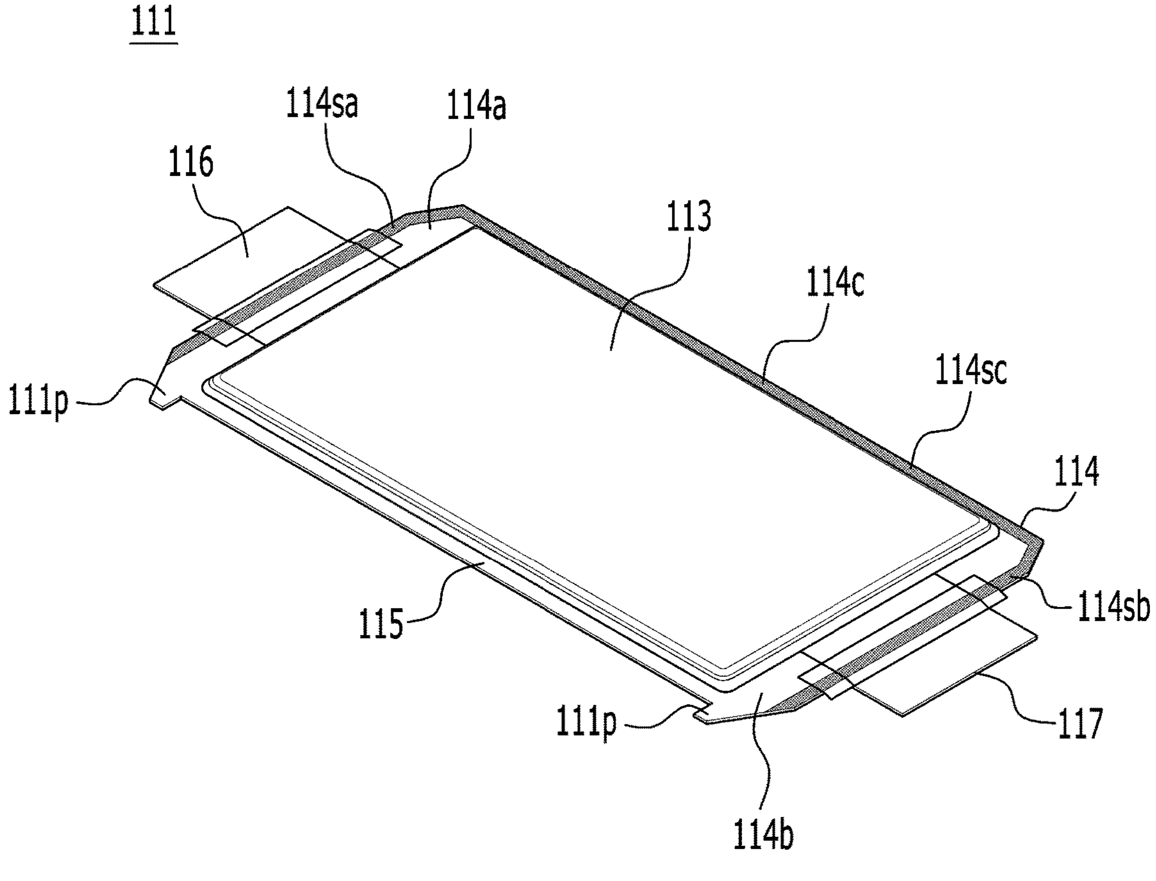

【FIG. 5】
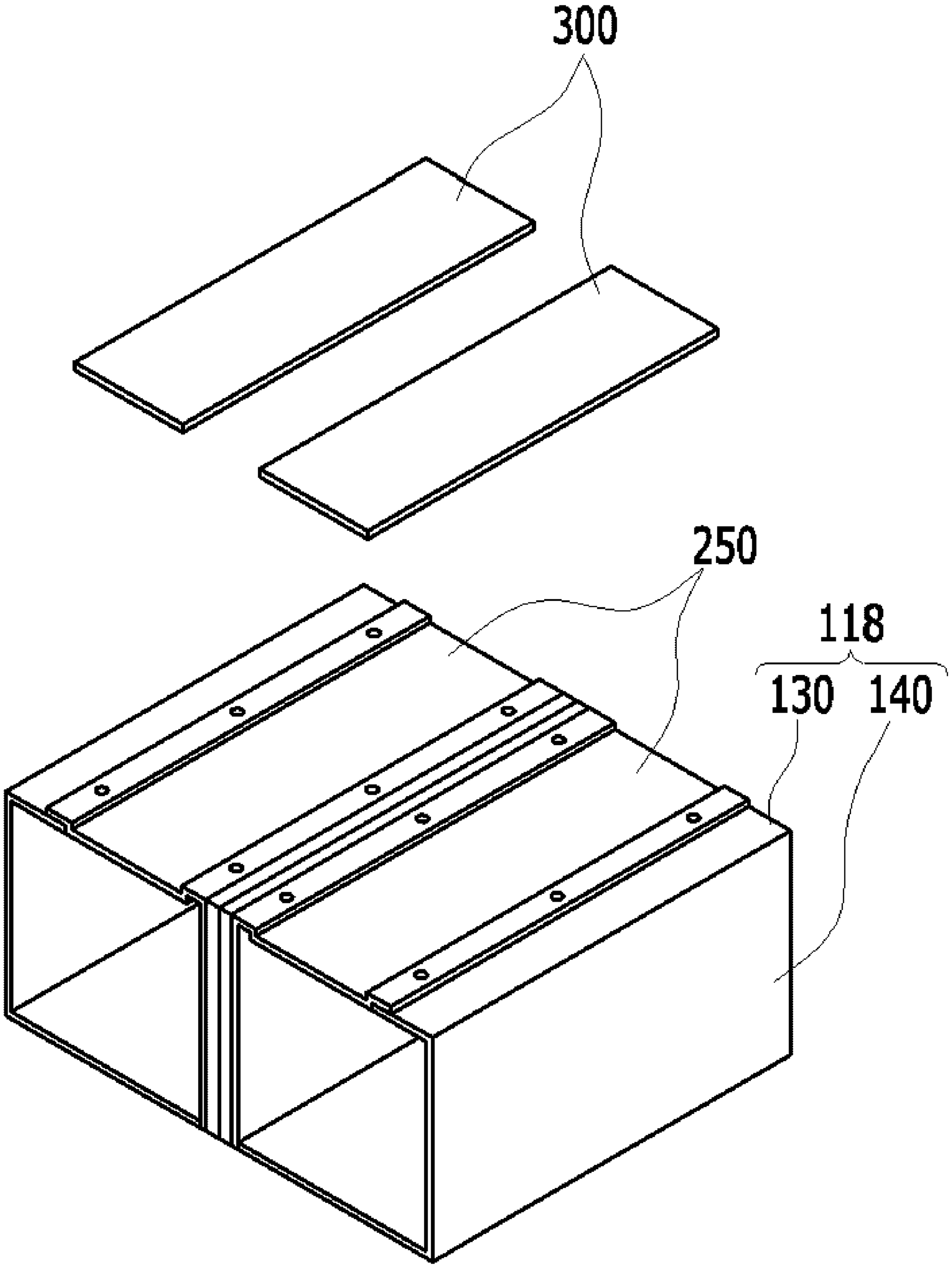

【FIG. 6】
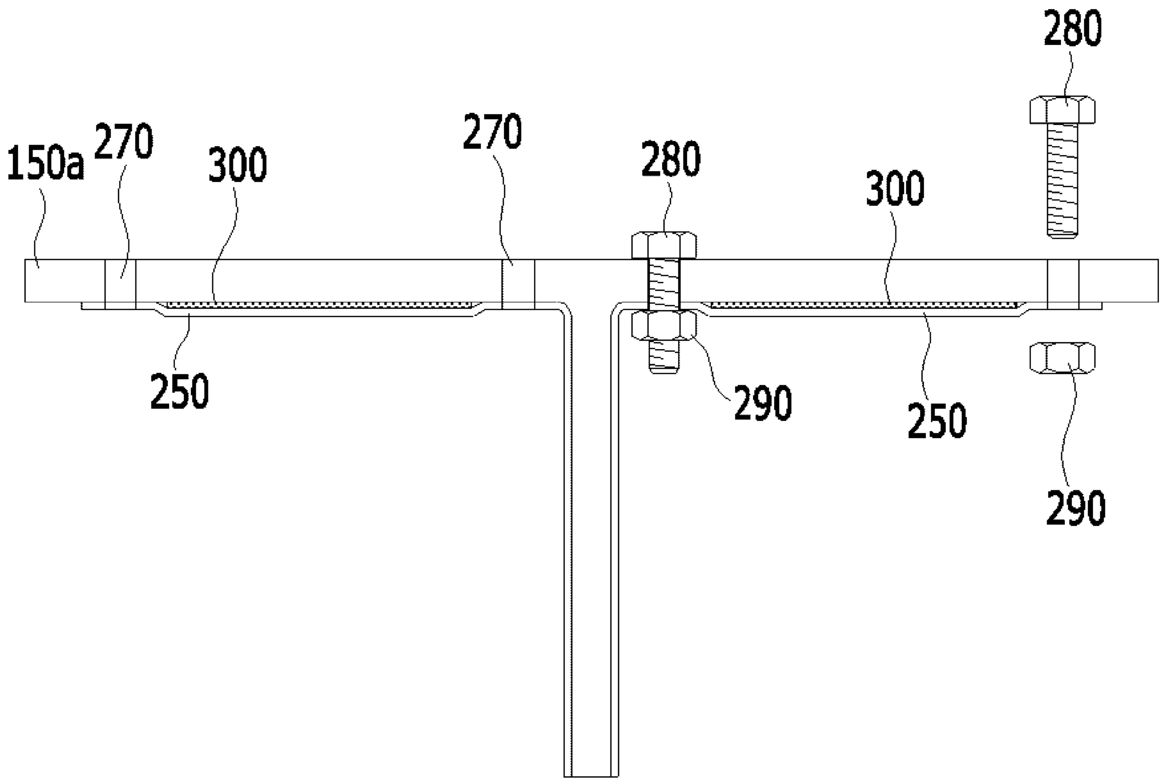

【FIG. 7】
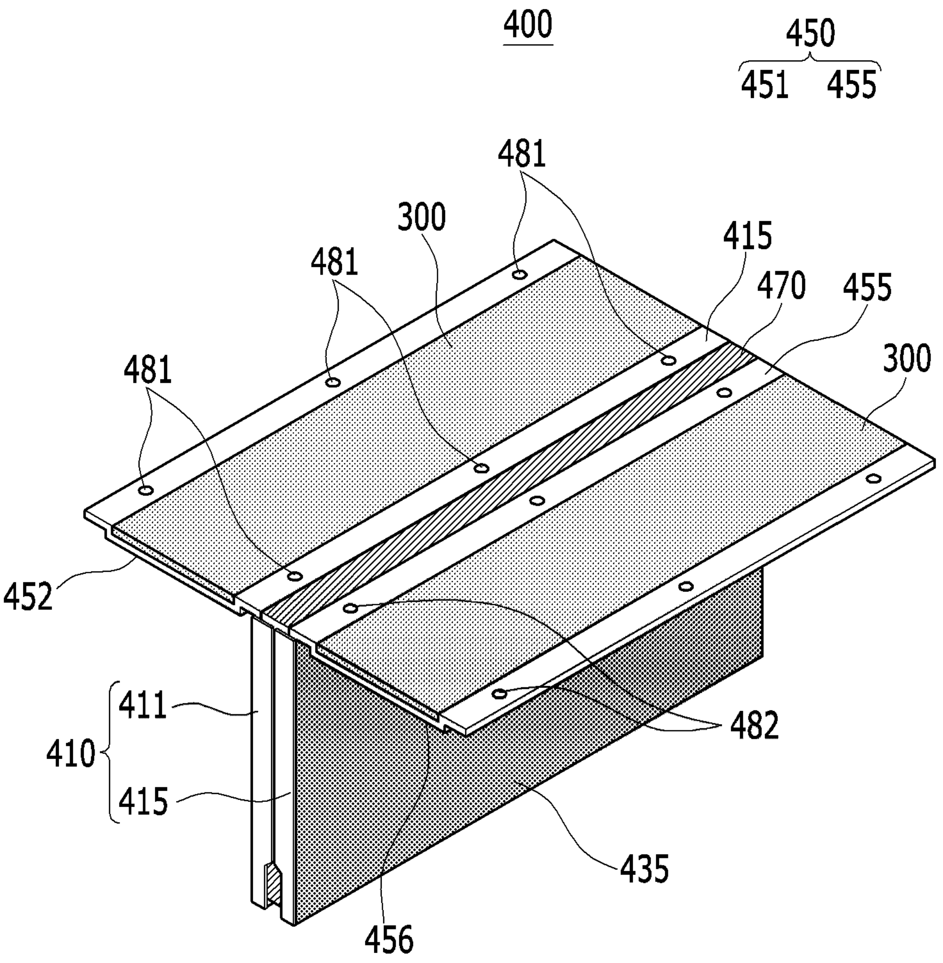

【FIG. 8】
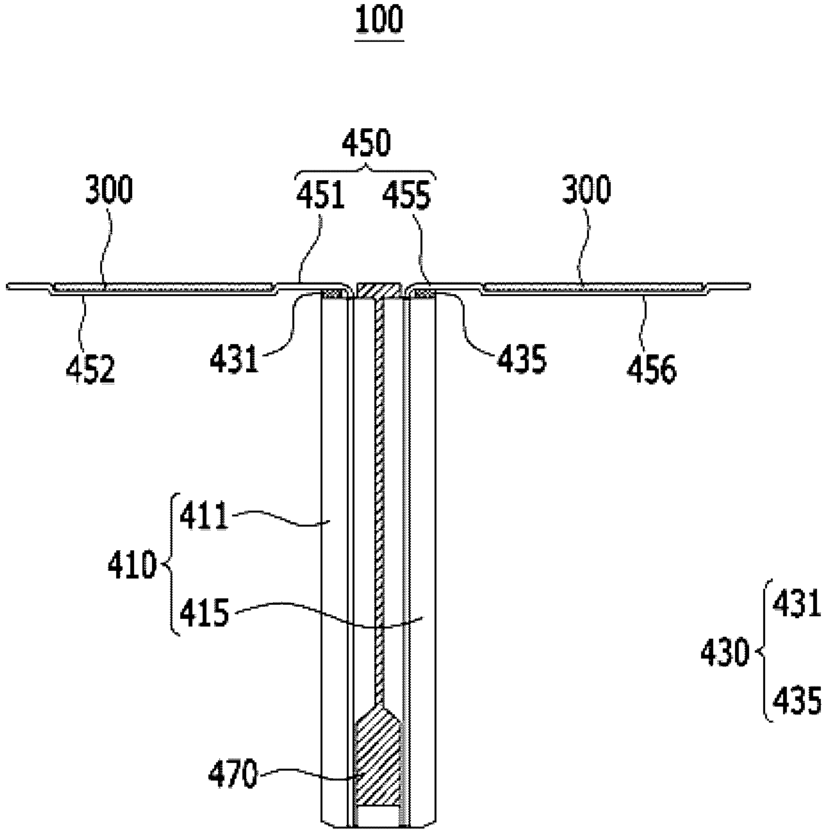

BATTERY PACK AND DEVICE INCLUDING THE SAME

TECHNICAL FIELD

Cross Citation with Related Application(s)

This application claims the benefit of Korean Patent Application No. 10-2021-0054358 filed on Apr. 27, 2021 and Korean Patent Application No. 10-2022-0047510 filed on Apr. 18, 2022 in the Korean Intellectual Property Office, the contents of which are incorporated herein by reference in their entirety.

The present disclosure relates to a battery pack and a device including the same, and more particularly to a battery pack that minimizes thermal contact resistance and a device including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently, commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects in comparison with nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate, each being coated with the positive electrode active material and the negative electrode active material, are arranged with a separator being interposed between them, and a battery case which seals and houses the electrode assembly together with an electrolyte solution.

Generally, the lithium secondary battery may be classified based on the shape of the exterior material into a can type secondary battery where the electrode assembly is mounted in a metal can, and a pouch-type secondary battery where the electrode assembly is mounted in a pouch of an aluminum laminate sheet.

In the case of a secondary battery used for small-sized devices, two to three battery cells are arranged, but in the case of a secondary battery used for a middle or large-sized device such as an automobile, a battery module in which a large number of battery cells are electrically connected is used. In such a battery module, a large number of battery cells are connected to each other in series or parallel to form a cell assembly, thereby improving capacity and output. In addition, one or more battery modules can be mounted together with various control and protection systems such as a BMS (battery management system) and a cooling system to form a battery pack.

The battery pack consists of a structure made by combining a plurality of battery modules, and when some battery modules become an overvoltage, overcurrent or overheat state, the safety and operating efficiency of the battery pack may be an issue. Further, the capacity of the battery pack tends to gradually increase in order to improve the mileage of electric vehicles or the like equipped with the battery pack, whereby it is necessary to design a structure for satisfying the safety standards that are strengthened along with an increase of the energy inside the pack, and improving the safety at the time of ignition in the module in order to secure the safety of a vehicle and a driver.

In particular, when ignition occurs in the battery module in the battery pack, the need for a structure capable of blocking heat transfer and rapidly transferring heat energy is emerging. However, in the formation of the above structure, there may be a problem that heat energy is not smoothly transferred due to contact resistance between the structures constituting the heat energy movement path. Therefore, there is a need to develop a heat energy transfer structure capable of rapidly transferring heat energy while minimizing thermal contact resistance.

DETAILED DESCRIPTION OF THE INVENTION

Technical Problem

It is an object of the present disclosure to provide a battery pack that minimizes thermal contact resistance and a device including the same.

However, the problem to be solved by the embodiments of the present disclosure is not limited to the above-described problems, and can be variously expanded within the scope of the technical idea included in the present disclosure.

Technical Solution

According to an embodiment of the present disclosure, there is provided a battery pack comprising: a plurality of battery modules; and a pack case for housing the plurality of battery modules, wherein the pack case comprises an upper case, and wherein the battery pack further comprises at least one heat radiating member formed so as to make contact with the upper case.

The at least one heat radiating member includes a recessed part, and a cooling pad may be formed in the recessed part.

The cooling pad is fitted in the recessed part, and the cooling pad may be formed to have a same size as the recessed part.

The cooling pad may be formed of a silicone-based or acrylic-based material.

The at least one heat radiating member is bent at a right angle, and a plurality of fastening parts may be further included in a second region, the second region contacting the upper case.

Each of the plurality of fastening parts may include a bolt member and a nut member, and the nut member may be located and coupled at a lower end of the bolt member.

When the bolt member and the nut member are coupled, the nut member rises and the at least one heat radiating member may be brought into contact with the upper case.

The battery module includes a module frame, the module frame includes an upper frame and a side surface frame, and the at least one heat radiating member may make contact with the upper frame and the side surface frame.

The at least one heat radiating member may be formed between adjacent battery modules among the plurality of battery modules.

The at least one heat radiating member may be a plurality of heat radiating members, and a first surface of each of the plurality of heat radiating members make contact with the side surface frame of one of the adjacent battery modules, the first surfaces of the plurality of heat radiating members face each other.

The at least one heat radiating member may include a frame member that includes a first frame and a second frame connected to each other, wherein an inner surface of the first frame and an inner surface of the second frame are folded to face each other; a first heat insulating member attached to an outer surface of the first frame; a second heat insulating member attached to an outer surface of the second frame; a central heat insulating member located between the inner surface of the first frame and the inner surface of the second frame; a first heat dispersion member located between the inner surface of the first frame and the central heat insulating member; and a second heat dispersion member located between the inner surface of the second frame and the central heat insulating member.

According to another embodiment of the present disclosure, there is provided a device comprising the above-mentioned battery pack.

Advantageous Effects

The battery pack according to an embodiment of the present disclosure has a novel form of the heat energy transfer structure and thus can rapidly transfer heat energy to the outside of the pack frame and the pack when ignition occurs in the battery pack. In addition, by minimizing the thermal contact resistance of the heat energy transfer structure, heat energy transfer efficiency can be increased, and safety of the battery pack can be improved.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a battery pack according to an embodiment of the present disclosure;

FIG. 2 is a perspective view which shows a heat radiating member formed in the battery pack of FIG. 1;

FIG. 3 is a perspective view which shows a battery module included in the battery pack of FIG. 1;

FIG. 4 is a perspective view which shows a battery cell included in the battery module of FIG. 3;

FIG. 5 is a perspective view which shows a heat radiating member and a cooling pad formed on the battery module of FIG. 3;

FIG. 6 is a diagram which shows the fastening part-coupling structure of the heat radiating member; and FIGS. 7 and 8 are diagrams which show a heat radiating member according to another embodiment included in the battery pack of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure can be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

The terms "first," "second," etc. mentioned herein may be used to explain various components, but the components should not be limited by the terms. These terms are only used to distinguish one component from the other component.

Hereinafter, the battery pack according to an embodiment of the present disclosure will be described. However, some components of the battery pack will be mainly described, but the present disclosure is not necessarily limited thereto, and may be described with the same or similar contents on the basis of the entire battery pack.

FIG. 1 is a perspective view of a battery pack according to an embodiment of the present disclosure. FIG. 2 is a perspective view which shows a heat radiating member formed in the battery pack of FIG. 1. FIG. 3 is a perspective view which shows a battery module included in the battery pack of FIG. 1. FIG. 4 is a perspective view which shows a battery cell included in the battery module of FIG. 3.

Referring to FIGS. 1 and 2, a battery pack 100 according to an embodiment of the present disclosure includes a plurality of battery modules 110, and a pack case 150 for housing the plurality of battery modules 110, wherein the pack case 150 includes an upper case 150*a* and a side surface case 150*b*, and the battery pack further includes a heat radiating member 200 formed so as to make contact with the upper case 150*a*.

In this case, referring to FIG. 3, the plurality of battery modules 110 may include a plurality of battery cells 111. More specifically, the plurality of battery cells 111 can be stacked along a predetermined direction and then mounted on the module frame 118 to configure a battery module 110. Further, since the plurality of battery cells 111 are not particularly limited by the type thereof, a pouch type secondary battery or a prismatic secondary battery may be used, but the pouch type secondary battery is preferable.

For example, referring to FIG. 4, the battery cell 111 according to the present embodiment has a structure in which two electrode leads 116 and 117 face each other and protrude from one end 114*a* and the other end 114*b* of the cell body 113, respectively. More specifically, the electrode leads 116 and 117 are connected to an electrode assembly (not shown), and protrude from the electrode assembly (not shown) to the outside of the battery cell 111.

Meanwhile, the battery cell 111 can be manufactured by joining both end parts 114*a* and 114*b* of a cell case 114 and one side part 114*c* connecting them in a state in which an electrode assembly (not shown) is housed in a cell case 114. In other words, the battery cell 111 according to the present embodiment has a total of three sealing parts 114*sa*, 114*sb* and 114*sc*, wherein the sealing parts 114*sa*, 114*sb* and 114*sc* have a structure that is sealed by a method such as heat-sealing, and the remaining other side part may be composed of a bending part 115. The cell case 114 may be composed of a laminated sheet including a resin layer and a metal layer.

In addition, the bending part 115 may extend long along one edge of the battery cell 111, and a protrusion part 111*p* of the battery cell 111 called a bat-ear may be formed at an end part of the bending part 115. The battery cell 111 may be configured in plural numbers, and the plurality of battery cells 111 can be stacked so as to be electrically connected to each other.

FIG. 5 is a perspective view which shows a heat radiating member and a cooling pad formed on the battery module of FIG. 3. FIG. 6 is a diagram which shows the fastening part-coupling structure of the heat radiating member.

Referring to FIG. 5, the battery module 110 included in the battery pack 100 of the present disclosure includes a module frame 118, and the module frame 118 may include an upper frame 130 and a side surface frame 140. At this time, the heat radiating member 200 makes contact with the upper frame 130 and the side surface frame 140 of the battery module 110, whereby at the time of ignition in the battery module, heat energy generated from the battery module may be quickly transferred to the upper case 150*a* and the side case 150*b* of the pack case 150 of the battery pack 100. The transferred heat can be discharged to the outside.

Further, the heat radiating member 200 may be formed between adjacent battery modules 110 among the plurality of battery modules 110, and may formed in a single number or plural numbers between the adjacent battery modules 110. In the heat radiating member 200 formed in plural numbers, the other surfaces of a surface where each heat radiating member 200 makes contact with the side surface frame 140 of the battery module 110 may be formed so as to face each other, or alternatively the other surfaces may be formed so as to make contact with each other. Additionally, a fixing member or the like can be further formed between the other surfaces to fix the plurality of heat dispersion members 200 to each other.

On the other hand, referring to FIGS. 2, 3, and 5, the heat radiating member 200 included in the battery pack 100 according to an embodiment of the present disclosure includes a recessed part 250, and a cooling pad 300 may be formed in the recessed part 250. The cooling pad 300 may be a compressible cooling pad. The cooling pad 300 may be fitted in the recessed part 250, and thus the cooling pad 300 may be formed to have the same size as the recessed part 250.

Further, the thickness of the cooling pad 300 may be formed to be the same as the depth of the recessed part 250. In addition, the cooling pad 300 may be formed of a compressible cooling pad, and may make close contact with the upper case 150*a* by a bolt member and a nut member described later, and thus, can be formed to be thicker than the depth of the recessed part 250.

The cooling pad 300 may be formed of a silicon-based or acrylic-based material. Specifically, the cooling pad may be a silicone pad, a silicone rubber pad, a silicone polymer pad, or the like, and may be an acrylic pad, an acrylic polymer pad, or the like, but is not limited thereto.

The cooling pad 300 is formed on the recessed part 250 of the heat radiating member 200 according to the present embodiment, wherein the cooling pad 300 not only is formed of a compressible cooling pad, thereby minimizing thermal contact resistance between the heat radiating member 200 and the upper case 150*a*, and increasing the adhesion, but also forms an additional cooling structure to enable rapid external discharge of ignition heat energy within the battery pack.

Further, referring to FIGS. 2 and 6, the heat radiating member 200 of the present disclosure is bent at a right angle, and a plurality of fastening parts 270 may be further included in a region other than the recessed part 250 of one surface of the heat radiating member 200 where the heat radiating member 200 makes contact with the upper case 150*a*.

In particular, adhesion between the upper case 150*a* and the heat radiating member 200 and between the upper case 150*a* and the cooling pad 300 may occur via the plurality of fastening parts 270. In order to effectively form the adhesion, the battery pack 100 according to the present embodiment may further include a bolt member 280 and a nut member 290 that are coupled by the fastening part 270. At this time, on the basis of the fastening part 270, the bolt member 280 may be located and coupled to the upper end of the fastening part, and the nut member 290 may be located and coupled to the lower end of the fastening part 270.

Moreover, referring to FIG. 6, when the bolt member 280 and the nut member 290 are coupled, the nut member 290 is located and coupled at the lower end of the fastening part 270, so that the nut member 290 is raised, and thus, the heat radiating member 200 of the present disclosure can be brought into close contact with the upper case 150*a*. Therefore, since the thermal contact resistance between the upper case 150*a* and the heat radiating member 200 is minimized through the close contact, and at the time of ignition in the module, heat energy can be rapidly transferred via the heat radiating member 200 and the upper case 150*a* to be discharged to the outside.

Next, the heat radiating member 400 included in the battery pack 100 according to another embodiment of the present disclosure will be described. The contents overlapping with the heat radiating member 200 described above will be omitted.

FIGS. 7 and 8 are diagrams which show a heat radiating member according to another embodiment included in the battery pack of the present disclosure.

Referring to FIGS. 7 and 8, the heat radiating member 400 according to the present embodiment may be formed in an integrated shape in which the heat radiating members 200 of FIG. 2 are formed in plural numbers and the other surfaces of a surface where each heat radiating member 200 makes contact with the side frame 140 of the battery module 110 are formed to abut on each other. Therefore, it can be understood that the heat radiating member 200 of FIG. 2 corresponds to a first heat dispersion member 451 or a second heat dispersion member 455 included in the heat radiating member 400 according to the present embodiment.

Specifically, the heat radiating member 400 according to the present embodiment includes a frame member 410 that includes a first frame 411 and a second frame 415 connected to each other, wherein the inner surface of the first frame 411 and the inner surface of the second frame 415 are folded to face each other; a first heat insulating member 431 attached to the outer surface of the first frame 411; a second heat insulating member 435 attached to the outer surface of the second frame 415; a central heat insulating member 470 located between the inner surface of the first frame 411 and the inner surface of the second frame 415; a first heat dispersion member 451 located between the inner surface of the first frame 411 and the central heat insulating member 470; and a second heat dispersion member 455 located between the inner surface of the second frame 415 and the central heat insulating member 470.

Further, the heat insulating member 430 can include a first heat insulating member 431 and a second heat insulating member 435. The first heat insulating member 431 is attached to the outer surface of the first frame 411, and the second heat insulating member 435 may be attached to the outer surface of the second frame 415.

Further, the heat insulating member 430 can be made of silicon oxide. In one example, the silicon oxide can consist of a material such as glass fiber. However, the material of the heat insulating member 430 is not limited thereto, and any material having high heat insulating properties may be included in the present embodiment. Thereby, in the present embodiment, the heat insulating member 430 can block the heat transfer between the adjacent battery modules 110 (FIG. 1).

Meanwhile, the central heat insulating member 470 can be located between the inner surface of the first frame 411 and the inner surface of the second frame 415. More specifically, the central heat insulating member 470 can be located between the first heat dispersion member 451 and the second heat dispersion member 455.

Further, the central heat insulating member 470 can be made of silicon oxide. In one example, the silicon oxide can consist of a material such as glass fiber. However, the material of the central heat insulating member 470 is not limited thereto, and any material having high heat insulating properties may be included in the present embodiment.

Therefore, in the present embodiment, even if heat is transferred from the battery module 110 (FIG. 1) to the first heat dispersion member 451 and the second heat dispersion member 455, respectively, the central heat insulating member 470 can block the heat transfer between the first heat dispersion member 451 and the second heat dispersion member 455.

Meanwhile, the heat dispersion member 450 can include a first heat dispersion member 451 and a second heat dispersion member 455. More specifically, the first heat dispersion member 451 is located between the inner surface of the first frame 411 and the central heat insulating member 470, and the second heat dispersion member 455 can be located between the inner surface of the second frame 415 and the central heat insulating member 470.

Here, the heat dispersion member 450 can further include a surface bent in a direction perpendicular to the frame member 410. More specifically, the first heat dispersion member 451 further includes a surface bent in a direction perpendicular to the first frame 411, and the second heat dispersion member 455 can further include a surface bent in a direction perpendicular to the second frame 415. Wherein, the first heat dispersion member 451 and the second heat dispersion member 455 may be bent in mutually opposite directions.

Further, the heat dispersion member 450 can be formed of a material such as aluminum (Al) or graphite. However, the material of the heat dispersion member 450 is not limited thereto, and any material having high thermal conductivity can be included in the present embodiment.

Thereby, in the present embodiment, the upper portion of the battery module 110 (FIG. 1) are located adjacent to the bent surface of the first heat distribution member 451 or the bent surface of the second heat distribution member 455, respectively. The heat generated in the battery module 110 (FIG. 1) can be easily dispersed in the first heat dispersion member 451 or the second heat dispersion member 455.

Meanwhile, the heat radiating member 400 according to the present embodiment includes the recessed parts 452 and 456, and the cooling pad 300 can be formed in the recessed parts 452 and 456. At this time, the cooling pad 300 may be a compressible cooling pad. The cooling pad 300 not only is formed on the recessed parts 452 and 456 of the heat dissipation member 400 according to the present embodiment, thereby minimizing the thermal contact resistance between the heat radiating member 400 and the upper case 150*a* and improving the degree of adhesion, but also can form an additional cooling structure to enable rapid external discharge of ignition heat energy within the battery pack. Further, the heat radiating member 400 of the present embodiment is bent at a right angle, and a plurality of fastening parts 481 can be further included in the region other than the recessed parts 452 and 456 in the region of one surface of the heat radiating member 400 where the heat radiating member 400 makes contact with the upper case 150*a*.

In particular, adhesion between the upper case 150*a* and the heat radiating member 400, and between the upper case 150*a* and the cooling pad 300 can occur via the plurality of fastening parts 481. Therefore, since the thermal contact resistance between the upper case 150*a* and the heat radiating member 400 is minimized through the close contact, heat energy at the time of ignition in the module is rapidly transmitted via the heat radiating member 400 and the upper case 150*a* to be discharged to the outside.

The conventional structure for heat transfer does not make close contact with the pack case and upper case of the battery pack, especially one surface of the upper case adjacent to the inside of the battery pack in which the battery module is located, which causes a problem that the thermal contact resistance increases. Further, as the thermal contact resistance increases, the heat energy in the battery pack is not transferred quickly, whereby when ignition occurs in the module, it was difficult to quickly transfer heat energy to suppress the ignition.

Therefore, the battery pack of the present disclosure includes a heat radiating member, and the heat radiating member includes a recessed part and a compressible cooling pad formed on the recessed part, so that the heat radiating member can make close contact with the upper case of the battery pack. Further, the degree of adhesion of the heat radiating member to the upper case is increased through the fastening part included in the heat radiating member, and stable heat transfer structure can be formed by allowing the heat radiating member to fix to the upper case.

Further, the battery pack according to the present disclosure can be applied to various devices. Such a device can be applied to a vehicle means such as an electric bicycle, an electric vehicle, or a hybrid vehicle, but the present disclosure is not limited thereto, and is applicable to various devices that can use a battery module, which is also falls within the scope of the present disclosure.

Although preferred embodiments of the present disclosure have been described in detail above, the scope of the present disclosure is not limited thereto, and numerous other modifications and embodiments can be devised by those skilled in the art, without departing from the spirit and scope of the principles of the invention described in the appended claims. Further, these modifications should not be understood individually from the technical spirit or perspective of the present disclosure.

DESCRIPTION OF REFERENCE NUMERALS

100: battery pack
110: battery module
111: battery cell
118: module frame
130: upper frame
140: side surface frame
150: pack case
150*a*: upper case
150*b*: side surface case
200, 400: heat radiating member
250: recessed part
270: fastening part
280: bolt member
290: nut member
300: cooling pad

The invention claimed is:

1. A battery pack comprising:
a plurality of battery modules; and
a pack case for housing the plurality of battery modules,
wherein the pack case comprises an upper case, and
wherein the battery pack further comprises at least one heat radiating member formed so as to make contact with the upper case, and
wherein the at least one heat radiating member comprises:
a recessed part facing the upper case; and
a cooling pad formed in the recessed part and in direct contact with the upper case.

2. The battery pack of claim 1, wherein:
the cooling pad is fitted in the recessed part, and
the cooling pad is formed to have a same size as the recessed part.

3. The battery pack of claim 2, wherein:
the cooling pad is formed of a silicone-based or acrylic-based material.

4. The battery pack of claim 3, wherein:
the at least one heat radiating member is bent at a right angle, and
a plurality of fastening parts are further included in a second region, the second region contacting the upper case.

5. The battery pack of claim 4,
wherein each of the plurality of fastening parts comprises a bolt member and a nut member, and
wherein the nut member is located and coupled at a lower end of the bolt member.

6. The battery pack of claim 5, wherein:
when the bolt member and the nut member are coupled, the nut member rises and the at least one heat radiating member is brought into contact with the upper case.

7. The battery pack of claim 1, wherein:
the battery module comprises a module frame,
the module frame comprises an upper frame and a side surface frame, and
the at least one heat radiating member makes contact with the upper frame and the side surface frame.

8. The battery pack of claim 7, wherein:
the at least one heat radiating member is formed between adjacent battery modules among the plurality of battery modules.

9. The battery pack of claim 8, wherein:
the at least one heat radiating member is a plurality of heat radiating members,
a first surface of each of the plurality of heat radiating members makes contact with the side surface frame of one of the adjacent battery modules, and
the first surfaces of the plurality of heat radiating members face each other.

10. The battery pack of claim 1, wherein:
the at least one heat radiating member comprises:
a frame member that includes a first frame and a second frame connected to each other, wherein an inner surface of the first frame and an inner surface of the second frame are folded to face each other;
a first heat insulating member attached to an outer surface of the first frame;
a second heat insulating member attached to an outer surface of the second frame;
a central heat insulating member located between the inner surface of the first frame and the inner surface of the second frame;
a first heat dispersion member located between the inner surface of the first frame and the central heat insulating member; and
a second heat dispersion member located between the inner surface of the second frame and the central heat insulating member.

11. A device comprising the battery pack of claim 1.

* * * * *